(12) United States Patent
Specht

(10) Patent No.: US 6,484,401 B1
(45) Date of Patent: Nov. 26, 2002

(54) GEAR PART AND METHOD FOR FORMING A GEAR PART

(75) Inventor: Gerold Specht, Harsewinkel (DE)

(73) Assignee: Leico GmbH & Co. Werkzeugmaschinenbau, Ahlen (DE)

( * ) Notice: Subject to any disclaimer, the term of this patent is extended or adjusted under 35 U.S.C. 154(b) by 0 days.

(21) Appl. No.: 09/541,713

(22) Filed: Apr. 3, 2000

(30) Foreign Application Priority Data

Apr. 1, 1999 (DE) .......................................... 199 15 027

(51) Int. Cl.[7] ............................................... B21D 53/28
(52) U.S. Cl. .............. 29/893.32; 29/893.3; 29/894.362; 29/892; 72/71; 72/82
(58) Field of Search .................... 29/893.3, 893.32, 29/893.33, 893.34, 892, 892.2, 894.362; 72/71, 82

(56) References Cited

U.S. PATENT DOCUMENTS

| | | | |
|---|---|---|---|
| 3,745,851 A | * | 7/1973 | Zeldman et al. |
| 5,396,787 A | * | 3/1995 | Kanemitsu et al. ...... 29/893.32 |
| 5,562,785 A | * | 10/1996 | Yamanaka ................ 29/893.32 |
| 5,823,904 A | * | 10/1998 | Hodjat et al. ........... 29/894.362 |
| 5,951,422 A | * | 9/1999 | Roes et al. .................... 29/892 |

* cited by examiner

*Primary Examiner*—P. W. Echols
(74) *Attorney, Agent, or Firm*—Oblon, Spivak, McClelland, Maier & Neustadt, P.C.

(57) ABSTRACT

A gear part and method is provided for forming a gear part, in which a circular blank-like workpiece is fixed in a flow-forming machine in a radially inner area, the circular blank-like workpiece is rotated, at least one roller is substantially radially moved, in which during the radial moving in workpiece material flows radially, so that the workpiece wall thickness is reduced in this area, in a central area of the workpiece a boss is formed and during radial moving in the roller is increasingly axially infed. The method also relates to forming a gear part in which the circular blank edge is thickened by at least one forming roller, the shaping of the circular blank edge taking place through the contour of gripping jaws and/or the forming roller and the cross-section of the circular blank edge is formed in an approximately rectangular manner.

17 Claims, 6 Drawing Sheets

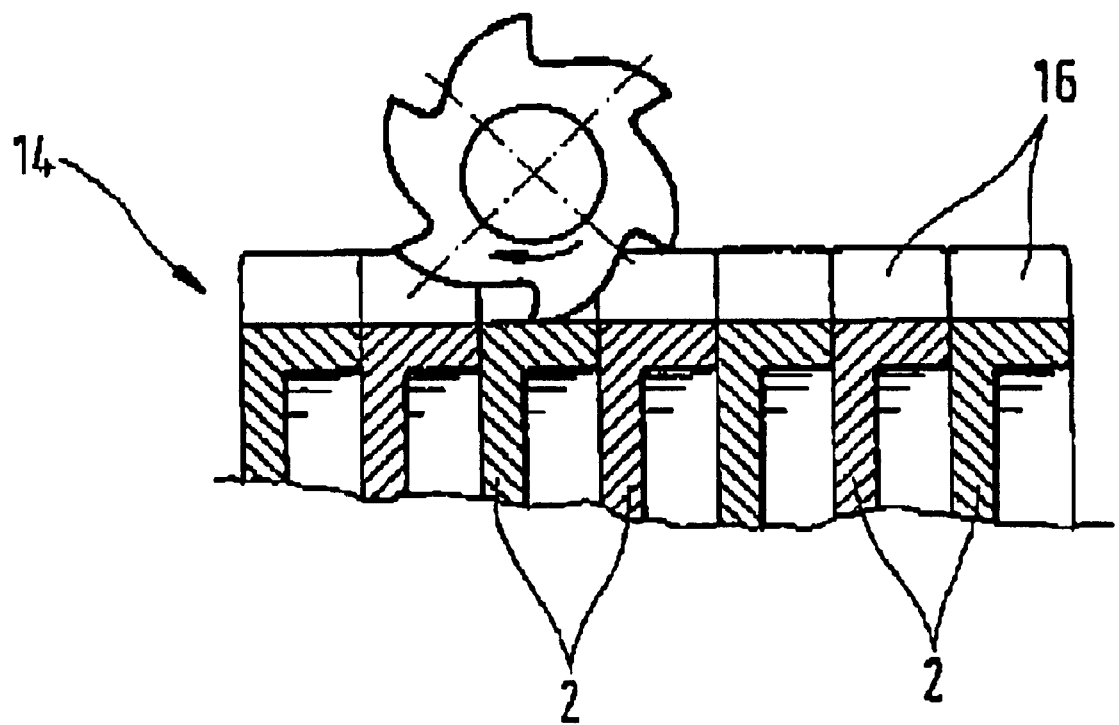

GEAR PART AND METHOD FOR FORMING A GEAR PART

BACKGROUND OF THE INVENTION

1. Field of the Invention

The invention relates to methods for forming or shaping a gear part, in which a workpiece is fixed with a radially directed area in a flow-forming machine, the workpiece is rotated and for modifying a wall thickness of the workpiece at least one roller is substantially radially infed. The invention also relates to a gear part, more particularly manufacturable with the methods according to the invention.

2. Description of the Background

Methods in which from a starting workpiece with a uniform wall thickness gear parts with a material-reinforced area are produced by flow-forming are well known. The aim of such methods is in a simple manner to produce by flow-forming a gear part, which on the one hand has an adequate stability and on the other a minimum weight.

These requirements more particularly apply to a starter ring gear for motor vehicles. As a result of its function a starter ring gear must at times transfer relatively high torques from a starter to an engine shaft. For relieving the starter a minimum starter ring gear weight is desirable.

SUMMARY OF THE INVENTION

The object of the invention is to provide methods and a gear part, particularly a starter ring gear, which more particularly satisfy the aforementioned requirements.

According to a first aspect of the invention a method according to the above-noted object is further developed in that the roller is radially moved along the radially directed area and workpiece material is radially displaced, the wall thickness of the workpiece being reduced in the particular area, and that for modifying the wall thickness of the workpiece the roller is axially adjusted during radial moving. In this manner, in a single method step, particularly during a single passage of the roller over the workpiece, a planned material distribution is set at the workpiece. The contour of the workpiece in its radial area can be made variable, because this is determined with respect to the workpiece by the cooperation of the radial and axial relative movement of the roller. By a thickness decrease or increase of the workpiece corresponding to the loading, a virtually optimum weight utilization is achieved on the finished gear part.

It can be advantageous for the axial infeeding of the roller to take place at least in part continuously. This leads to a smooth surface contour of the workpiece which can be advantageous as a function of the intended use of the gear part. It can also be useful if the axial infeeding of the roller takes place, at least in part, discontinuously. Thus, steps or other shapes can be made in the surface of the gear part, so that there is a considerable flexibility with regards to the design of the end product.

Preferably the wall thickness radially inwardly decreases in a radially inner area of the workpiece. Thus, the outer edge or rim of the circular blank maintains its original thickness and consequently all its material is available for further processing, particularly for inserting teeth. The inner area acquires in a planned manner a sufficiently great degree of flexibility, which is very advantageous in operation for avoiding wear on the tooth surfaces and for reducing noise formation.

Preferably the shaping of the boss is brought about through the shape of the roller and/or a countertool. Thus, different shapes can be given to the boss by selecting suitable tools.

It can also lead to advantages if, following its construction, the boss is cut off or punched. This can be useful with regards to the further processing of the workpiece, namely if processing steps are chosen in which the boss would be prejudicial.

The method according to the present invention is further developed according to a second aspect of the invention in that a radially outer edge of the workpiece is initially upset and cross-sectionally thickened in tear-shaped manner and following onto the tear-shaped, the thickened edge is upset and worked to a cross-sectionally approximately rectangular and in particular approximately square marginal area.

A fundamental idea of the invention is to shape the edge of a substantially radially extending workpiece so as to have a material accumulation, which has in an axial direction a predetermined width, as well as at least rounded corner areas, which link axially and radially directed lateral areas of the tear-shaped upsetting. In the following working step the rounded, tear-shaped edge or marginal thickening is slightly radially upset, while the axial width remains substantially unchanged. Corresponding to an angular contour of the spinning chuck or working roller during said working step the material displaced during upsetting is spun in the corner areas. This means that during this method step working and material flow almost exclusively take place in the lateral and in particular the corner areas, whereas the central area of the tear-shaped thickening is not deformed or is only scarcely deformed. Corresponding to the strong working or forming in the corner areas, an increased work hardening occurs there.

Thus, a marginally thickened workpiece is created, which firstly has a high strength corner and edge areas and secondly a less hardened tough core area. Such workpieces are eminently suitable for gear parts, because in these it is desirable to have a marginal area with a high strength, wear-resistant surface with a tough workpiece core suitable for dynamic loading. The material characteristics of the workpiece permit the manufacture of gear parts using conventional metal working steels with a high stability and a very low weight to form the gear parts.

Preferably use is made of a forming roller for the approximately rectangular forming or the circular blank edge, which has two radially projecting, shaping side walls, which enclose an angle between 1.5 and 6°. As a result of said slight bevel of the forming roller, after the upsetting process the roller can easily be removed from the formed workpiece.

It has proved to be particularly advantageous for the side walls of the forming roller A to have an angle of 3° with respect to the radial direction.

Preferably the at least one forming roller is infed in an axially displaced manner with respect to the circular blank face. This leads to a gear part asymmetrical to the plane of centers, which is desirable in numerous applications.

The forming bevels resulting from the forming operation are preferably trued. Such forming bevels e.g. arise through the use of a forming roller with sloping side walls. As a result of the following truing of the resulting bevels it is possible to provide an exact, e.g. rectangular shape of the circular blank edge.

Preferably external teeth are formed in the circular blank edge. In the case of tooth systems it is desirable to have dynamically loadable teeth with high strength edge areas.

According to the invention it is appropriate for modifications to existing installations for the external teeth to be made by machining. This can e.g. take place using gear cutters or on corresponding slotting machines.

However, according to a particularly advantageous embodiment of the method according to the invention the external teeth are produced by flow-forming with at least one gear cutting roller or by cross-rolling with at least one cross-rolling ledge. As a result of this non-cutting forming of the tooth system a further work hardening occurs and also the tooth flanks are hardened with respect to the core areas of the individual teeth. In the case of gear wheels manufactured in this manner, even without a subsequent heat treatment excellent tribological characteristics of the tooth system are obtained. As a result of the highly strengthened edge and corner areas a premature tooth breakage or pitting are avoided in operation, even in the case of an unforeseen edge run of the tooth system.

It can also be advantageous if the tooth system is obtained by stacking several gear parts and subsequently making a tooth system in the gear part stack. It is consequently possible to simultaneously process several gear parts with a uniform operating process.

The invention also makes available a gear part which has a flat, rotationally symmetrical shape, the marginal area being cross-sectionally substantially thickened in rectangular manner and a radially inner area is radially inwardly reduced in thickness. Such a gear part, which can in particular be manufactured using the method according to the invention, with respect to the wear which occurs and the noise formation offers advantages compared with the prior art gear parts. Due to the reduction in the wall thickness the gear part is flexible, so that the teeth of the gear part combine in careful manner with the teeth of other gear parts.

The gear part is preferably provided in a central area with a boss. Thus, there is an inner area for the absorption or delivery of power and an outer area for the absorption or delivery of power.

It is particularly advantageous if the boss and/or the marginal area has a tooth system. These standard power transmission means are preferred in numerous applications.

The invention is based on the unpredictable finding that it is possible to reduce wear and noise formation during the operation of a gear part by giving the latter a certain flexibility. The gear part according to the invention can be manufactured in a simple and variable manner by the methods given, so that the advantages of the invention arise both during the manufacture and the use of the gear part.

BRIEF DESCRIPTION OF THE DRAWINGS

Various other objects, features and attendant advantages of the present invention will be more filly appreciated as the same becomes better understood from the following detailed description when considered in connection with the accompanying drawings in which like reference characters designate like or corresponding parts throughout the several views and wherein:

FIG. 6 is an illustration of a detail of a gear part stack.

DESCRIPTION OF THE PREFERRED EMBODIMENT

Figure 1:
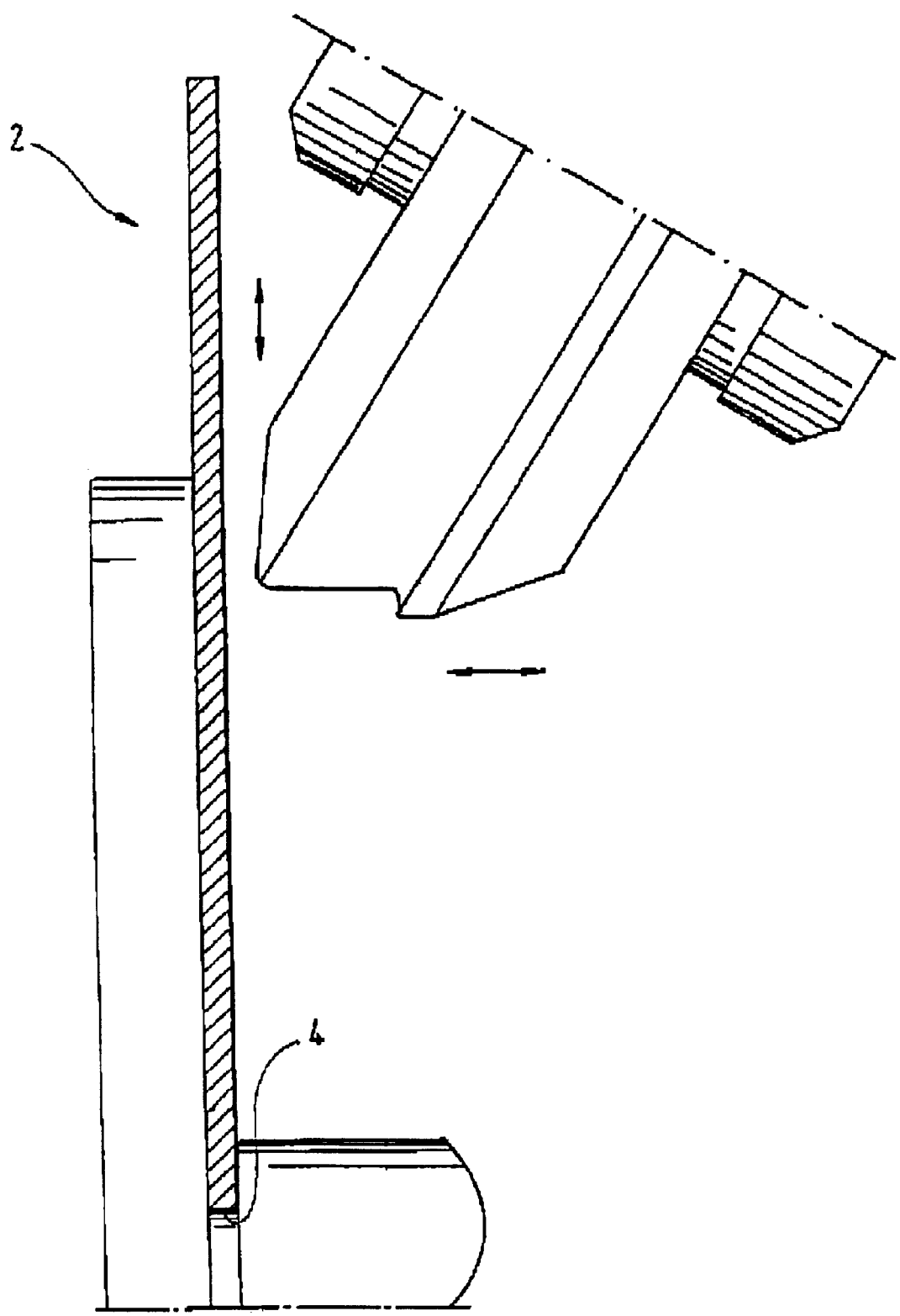
FIG. 1 is an illustration of the cross-section through a circular blank-like starting work piece.

FIG. 1 shows in cross-section a circular blank-like workpiece 2 with a central hole 4. The workpiece 2 can be fixed in a machine in different ways, e.g. by engaging in the central hole 4 or also by two axially displaceable gripping jaws.

Figure 2:
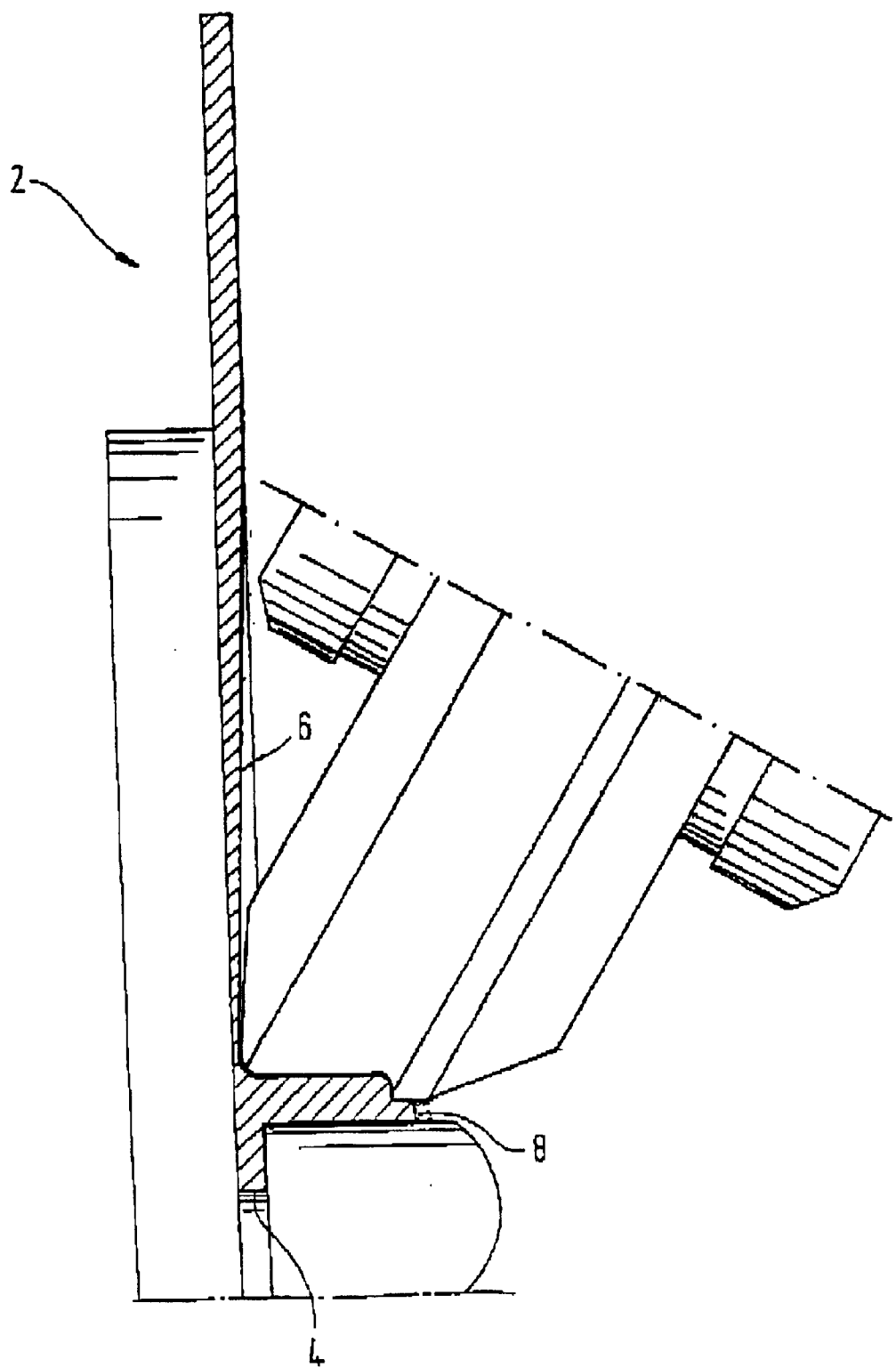
FIG. 2 is an illustration of a workpiece with a thickness reduced area and boss.

In FIG. 2 is illustrated the workpiece 2 following a first processing stage. An inner area 6 undergoes an increasing thickness reduction in the radial direction towards the center of the workplace 2. This area 6 of thickness reduced is followed by a boss 8. The reduced thickness area 6 is produced by infeeding a roller, which displaces radially the material of the worked piece 2 by axial and radial moving in. The separated material is used for forming the boss 8 on a suitable countertool, such as the chuck of the flow-forming machine.

Figure 3:
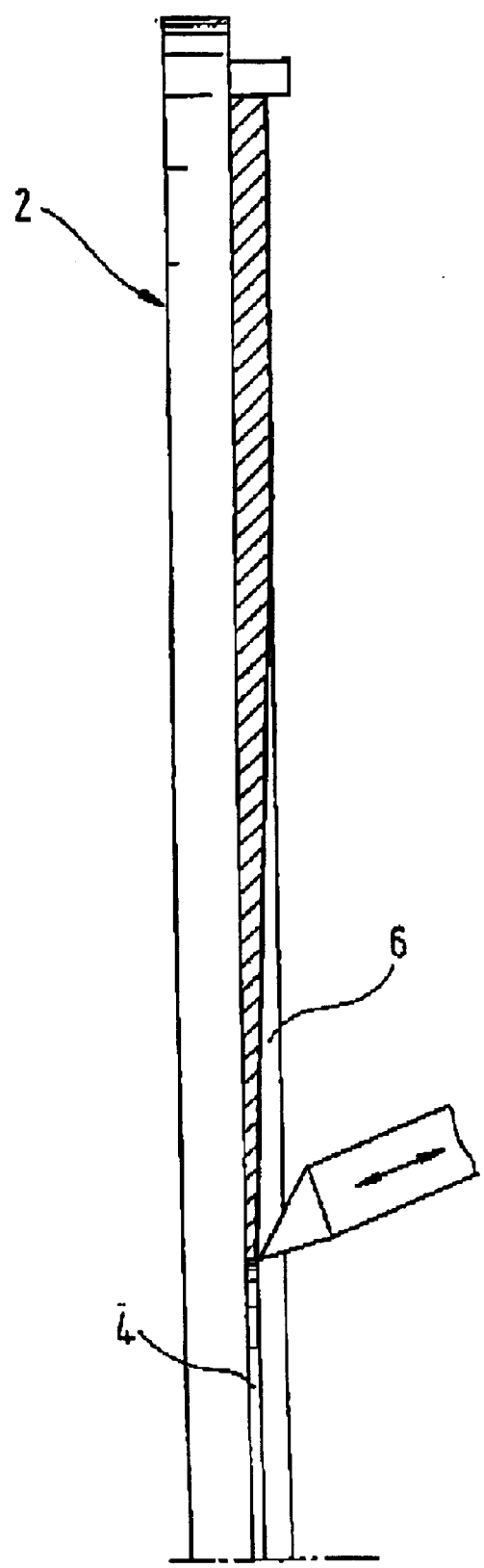
FIG. 3 is an illustration of a workpiece with a thickness reduced area.

In FIG. 3 is shown the workplace according to FIG. 2 following a further, optional working stage. Here the boss has been removed e.g. by cutting off or punching. This can be useful in conjunction with further processing stages where a separate boss is desired.

Figure 4:
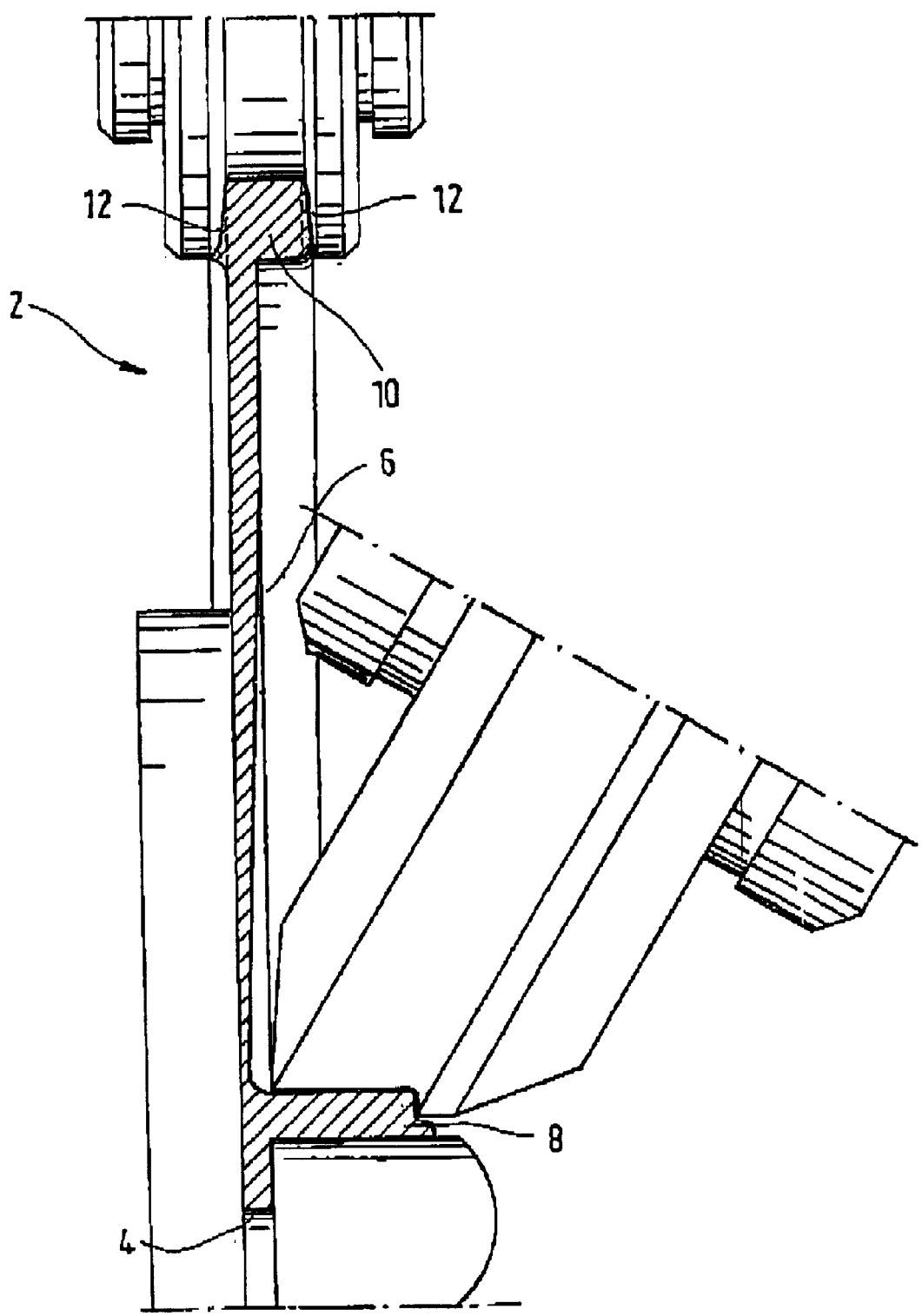
FIG. 4 is an illustration of a workpiece with a thickness reduced area, boss and upset marginal area.

The workpiece 2, formed in a further processing of the workpiece 2 according to FIG. 2, is shown in FIG. 4. A marginal area 10 has been substantially rectangularly thickened by means of one or more upsetting rollers. The shaping of the marginal area 10 takes place through the roller shape and/or by an upsetting zone of a countertool, e.g. the chuck. As can be seen, the marginal area 10 has a shape differing slightly from a rectangular shape. This results from the roller shape used in the present case. If the side walls of the roller which determine the shape are given a small included angle of approximately 3°, it is ensured that the roller can be easily removed following the upsetting process. The areas 12 differing from the rectangular shape can be removed in a further working stage, such as by cutting off such areas.

Figure 5:
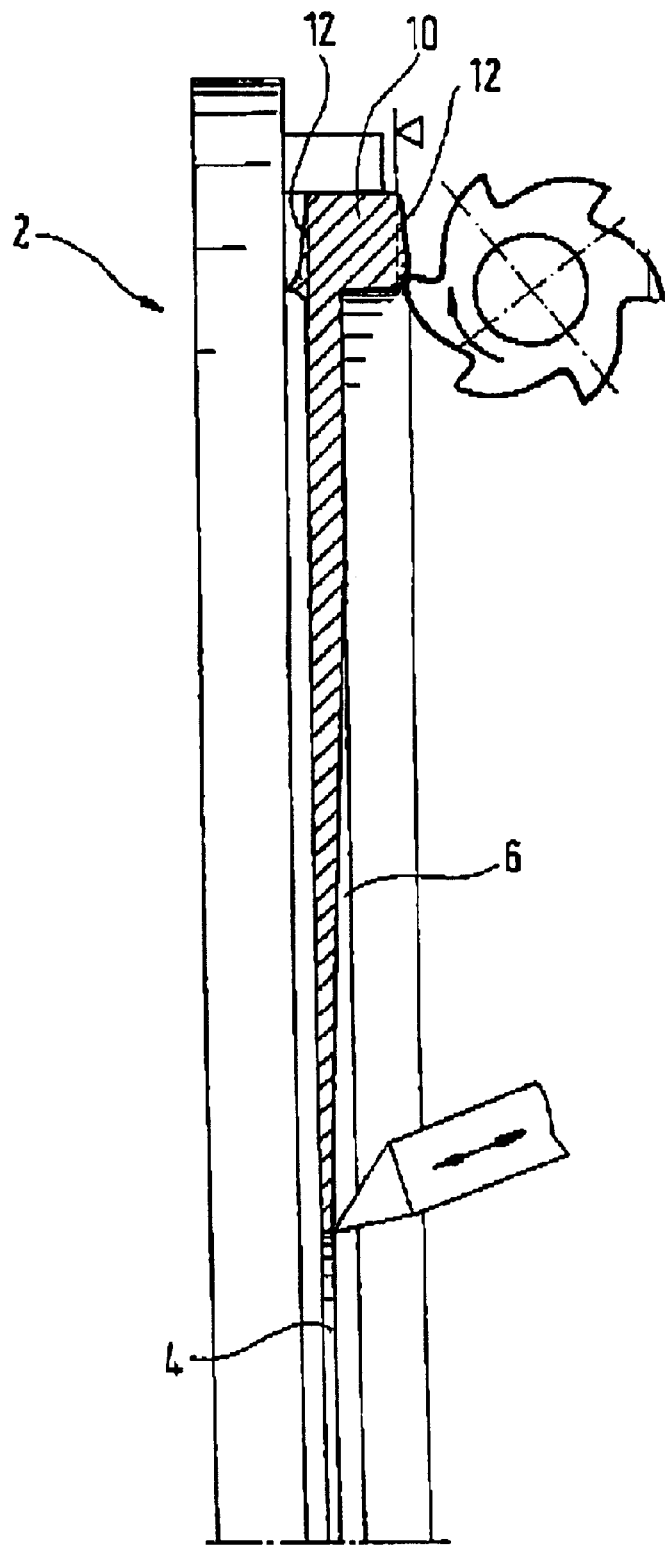
FIG. 5 is an illustration of a workpiece with a thickness reduced area and upset marginal area.

In FIG. 5 is shown the state of the workpiece 2 produced as a result of the further processing of the workpiece according to FIG. 3. Much as with the transition between the states according to FIGS. 2 and 4, a substantially rectangular marginal area 10 has also been produced here and otherwise reference is made to FIG. 4. The embodiment according to FIG. 5 is particularly advantageous with a view to a further processing explained hereinafter.

In FIG. 6 is shown a stack 14 of workpieces 2 or gear parts. A gear tooth element 16 has already been made in said stack by a cutting process. This stack arrangement is appropriate for a particularly efficient manner of making external teeth in the gear parts. Other possibilities for making external teeth consist of the synchronized use of an infed gear cutting roller or cross-rolling.

Obviously, numerous modifications and variations of the present invention are possible in light of the above teachings. It is therefore to be understood that within the scope of the appended claims, the invention may be practiced otherwise than as specifically described herein.

What is claimed is:

1. A method for forming a gear part, which comprises:
  fixing a workpiece with a radially directed area in a flow-forming machine;
  rotating the workpiece;

substantially radially moving at least one roller for modifying a wall thickness of the workpiece, the roller being simultaneously axially moved and radially moved along the radially directed area of the workpiece wherein material of the workpiece is radially displaced such that the wall thickness of the workpiece is reduced in said radially directed area; and axially adjusting the roller during radial inward movement of the roller for modifying the wall thickness of the workpiece.

2. Method according to claim 1, which comprises radially inwardly reducing the wall thickness in a radially inner area of the workpiece.

3. Method according to claim 1, which comprises displacing upon radially moving in of the roller, the material at the workpiece and for forming a boss in a central area of the workpiece.

4. Method according to claim 3, which comprises shaping the boss due to the shape of one of the roller and/or a countertool.

5. Method according to claim 3, which comprises one of cutting off the boss and/or punching the boss by contact with the roller.

6. Method according to claim 1 which comprises:

initially upsetting a radially outer edge of the workpiece and cross-sectionally thickening said outer edge so as to be tear-shaped; and subsequently upsetting the tear-shaped thickened edge and working said tear-shaped edge into one of a substantially rectangular cross-section and a rectangular cross-section having a square marginal area.

7. Method according to claim 6, wherein the tear-shaped thickened marginal area is thickened so as to form one of an approximately circular cross-section and an oval-shaped cross-section, with a predetermined axial width, and wherein the tear-shaped edge is radially slightly upset while substantially maintaining the axial width, and which comprises shaping and work hardening the corner regions of the marginal area.

8. Method according to claim 6, wherein upon substantially rectangular forming of A the marginal area, a forming roller engages the workpiece and which comprise two radially projecting, shaping side walls for forming bevels in the workpiece.

9. Method according to, claim 8, wherein, with respect to the radial direction, the side walls have an included angle between 1.5 and 6°, preferably approximately 3°.

10. Method according to claim 8, wherein the at least one forming roller is infed in an axially displaced manner with respect to a radial plane of a center portion of the workpiece.

11. Method according to claim 8, which comprises cutting off the bevels from the workpiece.

12. Method according to claim 6, which comprises forming an external tooth system in the marginal area.

13. Method according to claim 12, which comprises forming the external tooth system by flow-forming by use of at least one gear cutting roller or by use of cross-rolling with at least one cross-rolling ledge.

14. Method according to claim 12, which comprises using a machine to form the external tooth system.

15. Method according to claim 12, which comprises axially arranging a plurality of workpieces in a row, the thickened marginal area thereof engaging one another and being mutually supported such that the workpieces form an external tooth system.

16. Method according to claim 1, wherein the wall thickness of the workpiece is substantially uniformly reduced in said radially directed area so as to have a substantially constant inward taper both to a point in proximity with a boss portion of the workpiece and which comprises forming gear teeth on an outer portion of the workpiece at one of a point in time prior to the roller being radially moved along the workpiece and a point in time after the roller has been moved along the workpiece.

17. The method according to claim 6, which comprises forming gear teeth on said marginal area.

* * * * *